(12) United States Patent
Albert et al.

(10) Patent No.: US 11,576,551 B2
(45) Date of Patent: Feb. 14, 2023

(54) WATER-CONDUCTING HOUSEHOLD APPLIANCE AND METHOD FOR OPERATION THEREOF

(71) Applicant: E.G.O. Elektro-Geraetebau GmbH, Oberderdingen (DE)

(72) Inventors: Tobias Albert, Kraichtal (DE); Uwe Koegel, Kuernbach (DE); Uwe Schaumann, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 0 days.

(21) Appl. No.: 16/823,507

(22) Filed: Mar. 19, 2020

(65) Prior Publication Data

US 2020/0337518 A1    Oct. 29, 2020

(30) Foreign Application Priority Data

Apr. 25, 2019 (DE) ...................... 10 2019 205 919.8

(51) Int. Cl.
*A47L 15/42* (2006.01)
*A47L 15/00* (2006.01)
(Continued)

(52) U.S. Cl.
CPC ....... *A47L 15/4208* (2013.01); *A47L 15/0047* (2013.01); *A47L 15/0057* (2013.01);
(Continued)

(58) Field of Classification Search
CPC ............. A47L 15/4208; A47L 15/0047; A47L 15/0057; A47L 15/4221; A47L 15/4297;
(Continued)

(56) References Cited

U.S. PATENT DOCUMENTS

| 4,754,770 | A | 7/1988 | Fornasari |
| 7,835,195 | B2 | 11/2010 | Edwards et al. |

(Continued)

FOREIGN PATENT DOCUMENTS

| DE | 69850625 T2 | 11/2004 |
| DE | 10-2005-008987 B3 | 6/2006 |

(Continued)

OTHER PUBLICATIONS

European Patent Office, Extended European Search Report for Application No. 20168156.6, dated May 19, 2020, 9 pages, Germany.

(Continued)

*Primary Examiner* — Michael E Barr
*Assistant Examiner* — Pallavi Chitta
(74) *Attorney, Agent, or Firm* — Alston & Bird LLP

(57) ABSTRACT

A water-conducting household appliance has a closable treatment chamber, in order to treat articles therein, at least one chamber water inlet into the treatment chamber, at least one sump under said treatment chamber, a coarse particle filter for separating coarse particles having a size ≥5 mm from water exiting from the sump, wherein the coarse particle filter has a coarse particle filter inlet, a coarse particle filter water outlet and a coarse particle filtrate outlet. According to the invention, exactly one pump having a pump inlet and a pump outlet is provided for the entire household appliance, said pump being connected downstream of the sump and the coarse particle filter water outlet. Water lines, valve devices and a discharge outlet from the household appliance are also provided, wherein a water line leads from the coarse particle filter water outlet to the pump or to the pump inlet.

17 Claims, 6 Drawing Sheets

(51) Int. Cl.
  *C02F 1/00*     (2006.01)
  *D06F 39/00*    (2020.01)
  *D06F 39/10*    (2006.01)
  *D06F 103/20*   (2020.01)
  *C02F 103/00*   (2006.01)

(52) U.S. Cl.
  CPC ....... *A47L 15/4221* (2013.01); *A47L 15/4297* (2013.01); *C02F 1/001* (2013.01); *D06F 39/006* (2013.01); *D06F 39/10* (2013.01); *C02F 2103/002* (2013.01); *C02F 2201/005* (2013.01); *C02F 2303/16* (2013.01); *C02F 2307/12* (2013.01); *D06F 2103/20* (2020.02)

(58) Field of Classification Search
  CPC .. A47L 15/4291; A47L 15/4225; A47L 15/14; A47L 15/42; A47L 15/4202; A47L 15/4217; A47L 15/4223; C02F 1/001; C02F 2103/002; C02F 2201/005; C02F 2303/16; C02F 2307/12; D06F 39/006; D06F 39/10; D06F 2103/20; D06F 39/085; D06F 39/08; D06F 39/083
  See application file for complete search history.

(56) References Cited

U.S. PATENT DOCUMENTS

| | | | |
|---|---|---|---|
| 7,935,195 | B2 | 5/2011 | Gaus |
| 2008/0041419 | A1 | 2/2008 | Gaus |
| 2010/0043847 | A1* | 2/2010 | Yoon .................. A47L 15/4227 134/115 G |
| 2010/0252081 | A1* | 10/2010 | Classen ................. F04D 29/708 134/110 |
| 2012/0118336 | A1 | 5/2012 | Welch |
| 2017/0050131 | A1* | 2/2017 | Sparke ................... C02F 1/001 |

FOREIGN PATENT DOCUMENTS

| | | | |
|---|---|---|---|
| EP | 990413 | | 12/2003 |
| EP | 2785236 | A2 | 10/2014 |
| EP | 2862494 | A1 | 4/2015 |
| GB | 2176696 | A | 1/1987 |
| WO | WO-2013068300 A1 * | | 5/2013 ............. D06F 34/22 |

OTHER PUBLICATIONS

German Search Report for German Patent Application No. 10 2019 205 919.8, dated Nov. 13, 2018, (6 pages), The German Patent and Trade Mark Office, Munich, Germany.

\* cited by examiner

WATER-CONDUCTING HOUSEHOLD APPLIANCE AND METHOD FOR OPERATION THEREOF

FIELD OF APPLICATION AND PRIOR ART

The invention relates to a water-conducting household appliance, in particular a washing machine or a dishwasher. The invention also relates to a method for operating such a water-conducting household appliance.

EP 2785236 A1 discloses a washing machine in which water is conducted by means of water lines and in which there is provided a particle filter which can be back-washed for cleaning thereof.

EP 2 862 494 A1 discloses a water-conducting household appliance having a treatment chamber, in the lower region of which a sump is provided in a known manner. An impeller pump is provided directly below the sump such that it connects thereto, said pump being intended to minimize the overall height as a result of the small spacing in the vertical direction. Furthermore, water conduction is therefore simplified because water lines do not have to be provided therebetween.

PROBLEM AND SOLUTION

The invention is based on the problem of providing a water-conducting household appliance as mentioned in the introduction and a method for operation thereof, by way of which it is possible to solve problems of the prior art and it is in particular possible to advantageously construct such a household appliance using as few complex and possibly maintenance-prone components as possible and to be able to configure the operation in manifold ways.

Said problem is solved by way of a water-conducting household appliance having the features recite in the various claims. Advantageous and preferred refinements of the invention are provided in the further claims and are explained in more detail below. In this case, some of the features are described only for the household appliance or only for one of the methods. However, notwithstanding the above, they are intended to be able to apply, autonomously and independently of each other, both to the household appliance and to one of the methods for operation thereof. The wording of the claims is made content of the description by express reference.

Provision is made for the water-conducting household appliance to have a treatment chamber, which can be closed and in which articles can be treated, and at least one chamber water inlet into the treatment chamber. At the bottom in the treatment chamber or under the treatment chamber, there is provided at least one sump to which at least one sump water outlet which branches off from the sump can connect. By way of said outlet, water can therefore flow out of the sump. A coarse particle filter is provided for separating coarse particles having a size ≥5 mm from water in the treatment chamber or from water exiting from the sump, as mentioned above. Said coarse particle filter has a coarse particle filter inlet, a coarse particle filter water outlet and a coarse particle filtrate outlet. The coarse particle filter, by way of the coarse particle filter water outlet thereof, can also replace the aforementioned sump water outlet, particularly if the coarse particle filter at the bottom connects directly to the sump or is arranged directly on the sump or even at the bottom in the sump.

Furthermore, exactly one pump is provided for the entire household appliance, said pump being connected downstream of the sump water outlet or the coarse particle filter water outlet, this preferably being the single pump in the water circuit of the household appliance. Further pumps could thus be provided for example when dosing in cleaning agents, said pumps then, however, not operating in the water circuit or not conveying cleaning water or waste water. The pump has at least one pump inlet and at least one pump outlet. The appliance also has water lines, a water line from the coarse particle filter water outlet to the pump or to the pump inlet, various valve devices and a discharge outlet from the household appliance.

By providing a single pump it is possible to do without the customary two pumps. It is thus for example possible to dispense with a so-called lye pump or outlet pump which is customarily used mainly for pumping out water. The pump which is currently used only for recycling purposes and which is advantageously an impeller pump with axial intake and radial outlet is then used as said single pump. In addition to the recycling function, by way of suitable conduction of water, it then also undertakes the task of pumping water out of the household appliance. The term "single pump" is advantageously intended to mean that only a single conveyor or only a single pump impeller is provided. Similarly, it is also possible to provide only a single pump motor.

The coarse particle filter according to the invention can be configured as a so-called coarse particle trap and can be arranged in the lower region of the sump, said traps in fact also being known for dishwashers. Preferably, the coarse particle filtrate outlet can lead by means of a water line to the discharge outlet, wherein the coarse particle filter water outlet can form one of the sump water outlets.

In a refinement of the invention, at least one, preferably at least some, of the valve devices is/are configured as a shut-off valve and/or at least one, preferably at least some, of the valve devices is/are configured as a three-way valve and/or as a four-way valve. It is thus not only possible to shut off water such that it does not flow through a water line, but the water flow can be directed substantially freely and in manifold ways. This also makes it possible to dispense with the aforementioned lye pump, such that a single pump is sufficient for the conduction of water in the household appliance.

In an advantageous refinement of the invention, the household appliance has two chamber water outlets from the sump, wherein a coarse-particle chamber water outlet branches off from the coarse particle filtrate outlet of the coarse particle filter towards the discharge outlet, and wherein a normal chamber water outlet branches off from the sump, said normal outlet either being separate from the coarse particle filter or forming the coarse particle filter water outlet. Water exits from the sump towards the normal chamber water outlet, coarse particles which remain in the coarse particle filter or which have been filtered out thereby having been removed from said water. Relatively small contaminants may still be present in said water, but they cannot damage the single pump because they are too small. They may possibly be filtered out at a later stage, for example because there are microfibres which should, as far as possible, not make it into the waste water. The collected coarse particles can be flushed out of the coarse particle filter towards the coarse-particle chamber water outlet, such that they also exit, or are removed, from the appliance. However, this should take place in such a way that the water path containing the coarse particles does not run through the pump. The water is therefore introduced into the coarse particle filter by the pump and flushes the coarse particles out towards the coarse-particle chamber water outlet.

Advantageously, a water line is provided at the coarse particle filter water outlet and/or at the coarse particle filtrate outlet, which line in each case leads to the discharge outlet. It is thus possible for water and also filtrate from the coarse particle filter, that is to say the coarse particles themselves, to be flushed out of the appliance.

In addition, a coarse filter for water from the treatment chamber can be provided, said filter having a coarse filter inlet, a coarse filter water outlet for coarsely filtered water and a coarse filtrate outlet for coarse filtrate. Said coarse filtrate is composed of contaminants which are smaller than the coarse particles, that is to say contaminants having a size up to approximately 1 mm, for example. The coarse filter is preferably connected, at the coarse filter inlet thereof, by means of a water line to an aforementioned normal chamber water outlet. Downstream of the coarse filter water outlet, a water line can lead away, a valve device being able to be provided in said line. Water can thus be let out through an outlet from the coarse filter as desired.

Particularly preferably, the coarse filter is configured to be back-washable, in order to flush out or remove coarse filtrate from the coarse filtrate outlet, wherein the coarse filtrate outlet can preferably be led by means of a water line to the discharge outlet from the household appliance and/or to a measuring chamber. For back-washing or cleaning the coarse filter, water can be led, at the coarse filter water outlet, into the coarse filter, and therefore the coarse filtrate can exit from the coarse filtrate outlet towards the discharge outlet and can thus be removed.

Advantageously, a fine filter for water from the treatment chamber can be provided, said filter having a fine filter inlet, a fine filter water outlet for finely filtered water and a fine filtrate outlet for fine filtrate. Fine contaminants of this kind may be smaller than 0.01 mm or smaller than 0.1 mm, with in particular microfibres as mentioned above preferably being able to be filtered out therewith. The fine filter can be connected, at the fine filter inlet thereof, by means of a water line to the aforementioned coarse filter water outlet. Preferably, the fine filter inlet is also connected by means of a water line to the pump outlet, such that water conveyed by the pump can also be directly finely filtered.

The fine filter can preferably be back-washed for removing fine filtrate therefrom from the fine filtrate outlet, such that said fine filtrate can, on the one hand, be removed and can, on the other hand, also be examined. The fine filtrate outlet can be led by means of a water line to the discharge outlet from the household appliance and/or to a measuring chamber. For back-washing the fine filter, water can then be led towards the fine filter water outlet into the fine filter, such that the fine filtrate exits from the fine filtrate outlet towards the discharge outlet or can be led to the measuring chamber for examination.

In an advantageous refinement of the invention, a water path, by means of water lines from the chamber water outlet to the pump, is always led via the coarse particle filter and possibly also the aforementioned coarse filter. The coarse particle filter water outlet and possibly also the coarse filter water outlet can thus be connected to the pump inlet. The pumped water can even be more coarsely filtered thereby, that is to say a stage finer than in the necessarily provided coarse particle filter.

In a further refinement of the invention, a water reservoir is provided, which is connected by means of a water line to the chamber water inlet and/or can be connected by means of a water line to the pump and/or can be connected by means of a water line to a coarse particle filter inlet of the coarse particle filter, or can in each case be connected, for introducing water into the coarse particle filter in order to flush coarse particles located therein out of the coarse particle filtrate outlet towards the discharge outlet. Water lines and valves, either plain shut-off valves or multi-way valves, can be provided for said connection.

Such a water reservoir can be arranged at a height in the household appliance which lies above coarse particle filter, coarse filter, fine filter and/or measuring chamber, advantageously above all of these. Water can thus flow by itself into the mentioned apparatuses without needing to be pumped. Such a water reservoir is also known as a so-called water pocket in dishwashers.

A plurality of water reservoirs can be provided, for example a first water reservoir can be a clean water reservoir and a second water reservoir can be provided as a dirty water reservoir. The clean water reservoir can be configured for back-washing the filters and the dirty water reservoir can be provided for the treatment operation.

The coarse filter water outlet and/or the fine filter water outlet can be led by means of a three-way valve or a four-way valve to the water reservoir, in particular to the aforementioned clean water reservoir. It can also be led to the treatment chamber, wherein, in the case of a three-way valve, advantageously a first path can lead to the water reservoir and another second path can lead to the treatment chamber.

An aforementioned water reservoir, in particular the aforementioned clean water reservoir, can be connected to two water lines or two water lines can be led thereto. A first water line can lead via a valve device to the coarse filter water outlet and/or the fine filter water outlet. A second water line can lead via a valve device to the coarse filter, the fine filter and/or the pump, preferably by means of a three-way valve or by means of a four-way valve to all three functional units, and specifically particularly advantageously directly or indirectly.

In a further refinement, the water reservoir can be connected by means of two valve devices to the coarse filter water outlet, to the fine filter water outlet and/or to the pump inlet. Correspondingly filtered water can thus be introduced into the water reservoir or water can be pumped out therefrom.

As mentioned above, the household appliance can have a measuring chamber, in order to be able to examine water and/or filtrate therein. The measuring chamber can have a measuring chamber inlet, by way of which it can be connected to the coarse filtrate outlet and/or to the fine filtrate outlet. Fine filtrate or coarse filtrate can thus be examined therein. For this purpose, reference is explicitly made to the German patent application DE 10 2019 203 809.3 with filing date 20 Mar. 2019 from the same applicant.

The measuring chamber can have a measuring chamber inlet which is connected by means of water lines and a valve device to the coarse filter water outlet and/or to the fine filter water outlet, in particular also to the coarse filtrate outlet and/or to the fine filtrate outlet. The respective filtrate can thus be introduced therein for examination. Furthermore, finely filtered water can for example also be examined therein, in order to determine whether it has also actually been sufficiently, or sufficiently finely, filtered. A measuring chamber outlet can lead by means of a water line to the discharge outlet from the household appliance, in order to thus clean or empty the measuring chamber again.

The pump is arranged downstream of the coarse particle filter water outlet, in particular downstream of the coarse particle filter water outlet and downstream of the coarse filter water outlet. As an alternative, it can be arranged downstream of the coarse particle filter water outlet and upstream of the coarse filter inlet, then the contaminants, which are otherwise only removed in the coarse filter, can also make it into the pump. The pump can then also be arranged between the coarse particle filter water outlet and the coarse filter inlet.

In the case of a method according to the invention for operating such a water-conducting household appliance according to the invention, provision is made, for recycling water in said appliance during the treatment of articles in the treatment chamber, for water to exit from the sump towards the coarse particle filter water outlet. Said water flows through the coarse particle filter and through the pump and is pumped by the pump back towards the chamber water inlet into the treatment chamber again and/or into the at least one rinsing arm of a dishwasher and thus into the treatment chamber. In this case, when the water exits, it is always led via the coarse particle filter, such that coarse particles are always removed from the water before it flows through the pump, in order to protect the pump.

For removing the coarse particles from the coarse particle filter or from the household appliance during the treatment of articles in the treatment chamber, in order to pump water out of the sump and to clean the coarse particle trap, water can be pumped via the coarse particle filter inlet into the coarse particle filter and can be led out, together with coarse particles contained therein, towards the coarse particle filtrate outlet, said particles then being flushed in the direction of the discharge outlet from the household appliance. The water flow can therefore be reversed, and the coarse particle filter can thus be cleaned. To this end, the water can be pumped in by means of the pump towards the coarse particle filter inlet, wherein the water can be drawn in from a fresh water connection of the household appliance to the outside or from the aforementioned water reservoir.

For pumping water out of the sump during the treatment of articles in the treatment chamber, water can preferably be drawn in by the pump at the coarse particle filter water outlet of the sump. It can then be pumped out of the household appliance by way of the coarse particle filter and the pump towards the discharge outlet.

For removing the coarse particles from the coarse particle filter or from the household appliance during the treatment of articles in the treatment chamber, water can be drawn in from the water reservoir. It can then be pumped by way of the pump into the coarse particle filter water outlet of the coarse particle filter, such that the water, together with coarse particles collected therein, exits towards the coarse particle filter outlet from the coarse particle filter and is pumped by means of water lines towards the discharge outlet from the household appliance.

These and further features emerge not only from the claims but also from the description and the drawings, the individual features each being able to be implemented on their own or in multiple form in the form of sub-combinations in an embodiment of the invention and in other fields and being able to constitute advantageous embodiments worthy of protection on their own and for which protection is claimed here. The division of the application into intermediate headings and individual paragraphs does not restrict the statements made therein in terms of their general applicability.

BRIEF DESCRIPTION OF THE DRAWINGS

Further advantages and aspects of the invention will emerge from the claims and from the following description of preferred exemplary embodiments of the invention, which are explained below with reference to the figures, in which:

DETAILED DESCRIPTION OF THE EXEMPLARY EMBODIMENTS

Figure 1:
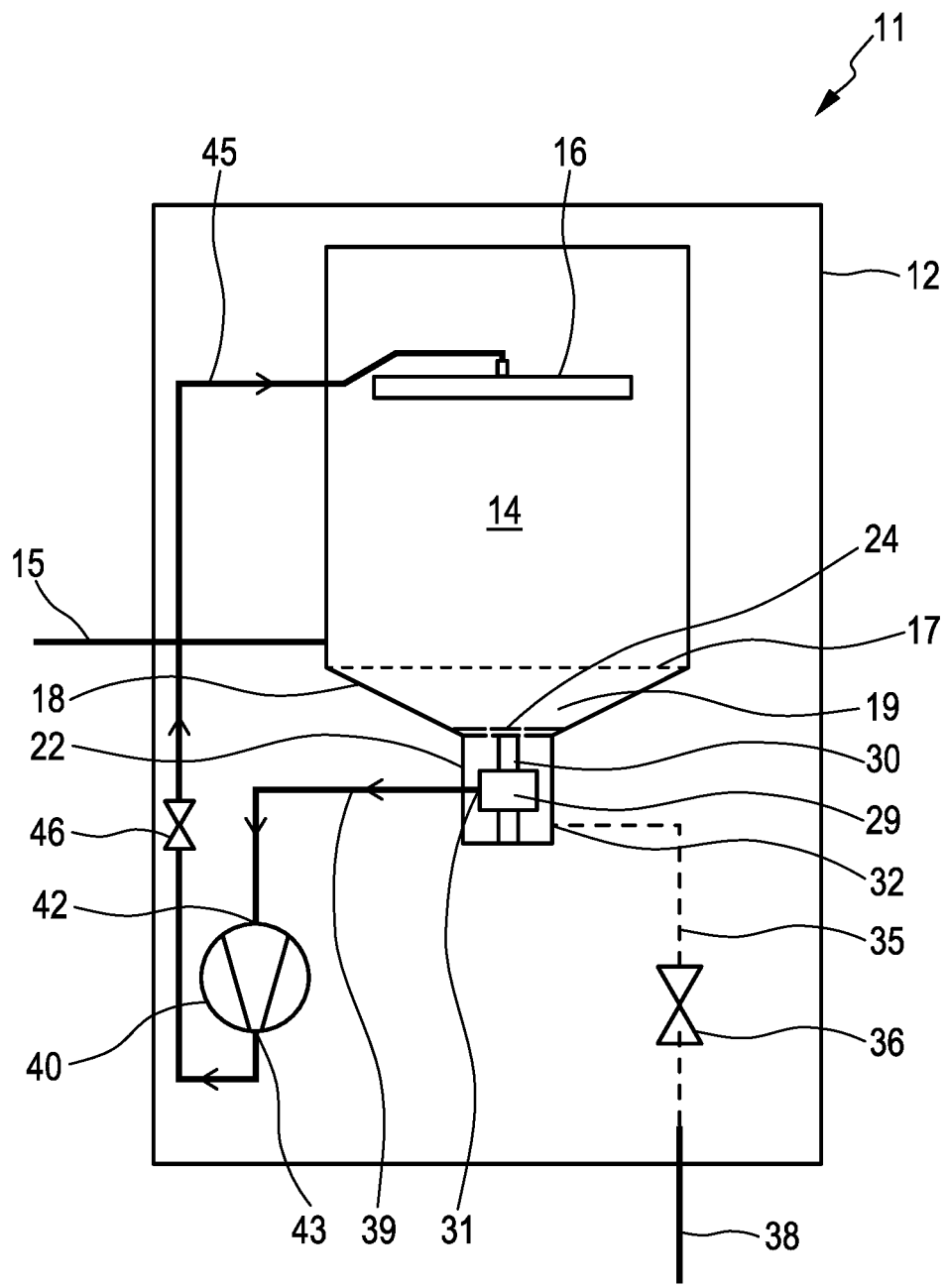
FIG. 1 shows a schematic functional view of a dishwasher having a single pump and water conduction for recycling the water.

FIG. 1 shows a highly simplified illustration of a dishwasher 11 having a housing 12 and a treatment chamber 14 therein. In said treatment chamber, a water inlet 15 leads in the lower region, advantageously from a water tap for supplying fresh water. The treatment chamber 14 has a customary rinsing arm 16, advantageously a plurality thereof, which are arranged in a differing manner. At the bottom, the treatment chamber 14 has a base 17, under which a sump 19 which is formed by a trough 18 is located. The sump 19 can be closed off towards the top by means of a perforated plate or the like, on which large particles and in particular also cutlery remain. However, medium-sized openings or a central opening lead/leads, as illustrated below in FIG. 3, into the sump 19 for collecting coarse particles. Here, FIG. 1 shows a schematic illustration of a sieve filter 24 in the sump 19, said filter forming the transition to a cylinder portion 22 which adjoins at the bottom. In said cylinder portion 22, there is located a coarse particle filter 29 which has a coarse particle filter inlet 30, a coarse particle filter water outlet 31 and a coarse particle filtrate outlet 32. Said coarse particle filter 29 is generally also known as a coarse particle trap and is explained specifically in more detail in FIG. 3.

The coarse particle filter inlet 30 goes upwards and is advantageously accessible by way of an opening of 1 cm to 3 cm through the sieve filter 24. In this case, for example cherry stones as coarse particles can make it into the coarse particle filter 29. The coarse particle filter water outlet 31 leads away to the left by means of a pump line 39. The coarse particle filtrate outlet 32 goes downwards as far as a base of the cylinder portion 22. From there, it goes by means of an outlet line 35 and a valve 36 to a discharge outlet 38 from the dishwasher 11.

The pump line 39 goes to a pump 40 which is configured, according to the invention, as the single pump of the entire dishwasher 11. Advantageously, it is an impeller pump. The pump 40 has a pump inlet 42, to which the pump line 39 leads, and a pump outlet 43, which is connected by means of a rinsing arm line 45 together with a valve 46 to the rinsing arm 16. Valves, either plain shut-off valves or particularly advantageously multi-way valves, are advantageously provided both in the pump line 39 and in the rinsing arm line 45, in order to also conduct the water in a differing manner from the pump 40.

With the water path, illustrated here by way of the solid line with arrows, through the pump line 39, the pump 40 and the rinsing arm line 45, a recycling operation and thus a rinsing of articles in the treatment chamber 14 can be performed. Advantageously, the pump 40 has a built-in or integrated heating means, such that the water can also be heated thereby. An otherwise known separate heating means at the bottom in the sump 19 is then not necessary.

Figure 2:
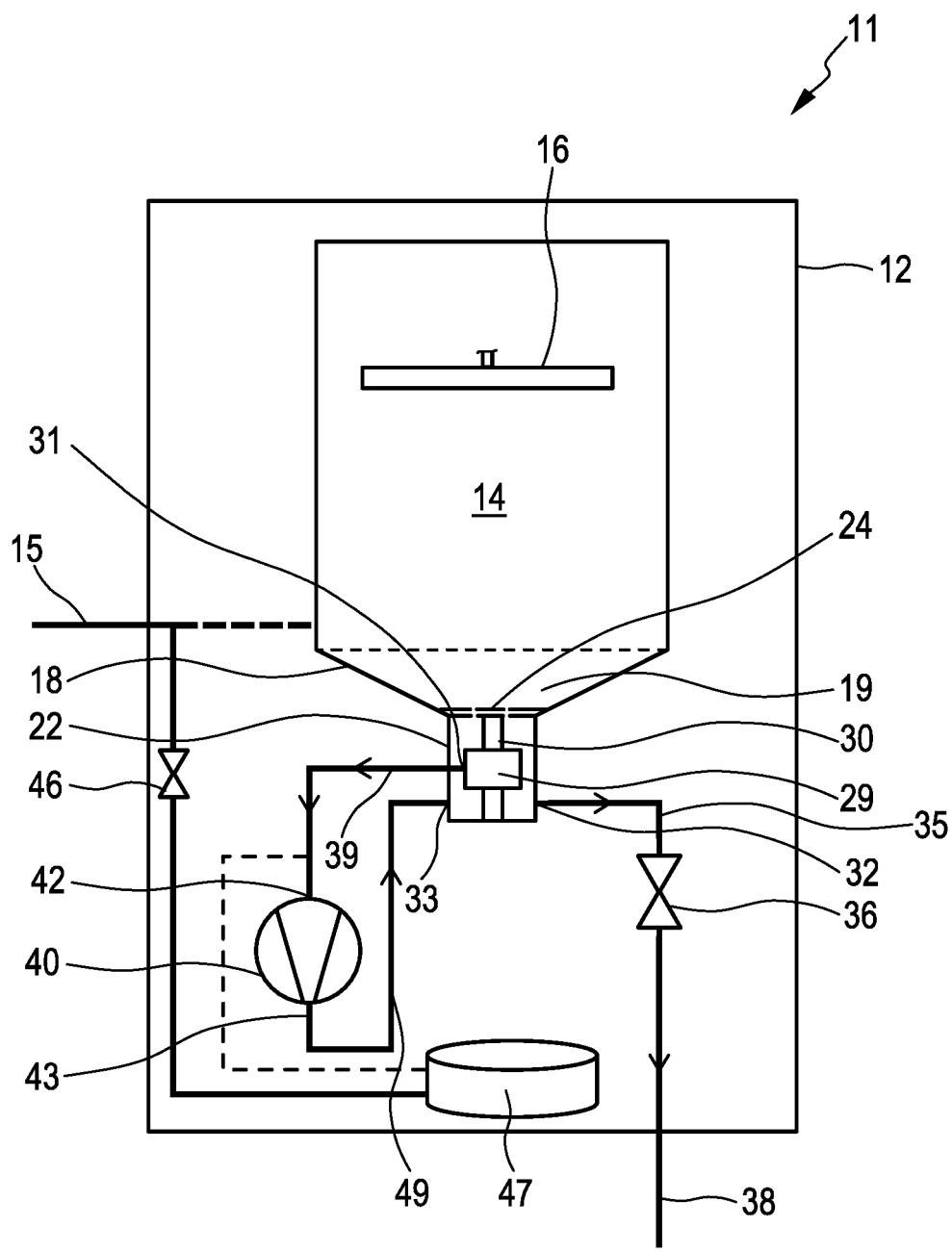
FIG. 2 shows the dishwasher from FIG. 1 with possibilities for the water conduction for back-washing a coarse particle filter in order to remove coarse particles or coarse particle filtrate contained therein.

FIG. 2 illustrates how water conduction is designed so that the coarse particle filter 29 can be cleaned, or coarse particles retained therein, such as, for example, cherry stones as mentioned above, can be removed from the dishwasher 11, by means of the single pump 40. Said particles could indeed also be collected at the top in the sump 19 or on the sump 19, for example by means of an aforementioned perforated plate or the like. From there, they could certainly be removed manually in a relatively simple manner. However, for reasons of hygiene and comfort, this should be avoided. In the prior art, in order to pump water out of the dishwasher 11, a so-called lye pump is provided, which can be configured as a simple impeller pump and thus can also convey the mentioned coarse particles directly during the pumping-out operation without being damaged in the process. With a pump of more complex configuration which is provided with more functions and which is intended to form the single pump 40 of the dishwasher, this is not possible. Therefore, FIG. 2 illustrates how the coarse particle filter 29 can be cleaned by means of the single pump 40 by way of the water conduction which is illustrated with arrows. For this purpose, it has a coarse particle filter flushing inlet 33. Water can be introduced into said coarse particle filter flushing inlet 33 from the sump 19 via the coarse particle filter 29, the coarse particle filter water outlet 31, the pump line 39, the single pump 40 and a flushing line 49. There, the water then entrains coarse particles which have collected in the coarse particle filter 29 and which have been held back from the water, such as, for example, cherry stones as mentioned above, and flushes them out towards the coarse particle filtrate outlet 32 into the outlet line 35. By way of the open valve 36, they can thus be flushed out towards the discharge outlet 38 from the dishwasher 11. The water conduction, illustrated by way of solid lines, in comparison to that from FIG. 1, is achieved by way of valves which are not illustrated here and which are easily conceivable.

Here, FIG. 2 illustrates a water reservoir 47 which can be connected by means of a water line and a valve 46 to the water inlet 15 into the dishwasher 11. Fresh water can thus be stored in the water reservoir 47. As an alternative, filtered water can also be introduced by the pump 40 into the water reservoir 47, as is known from the aforementioned German patent application DE 10 2019 203 809.3, to which explicit reference is made in this respect. For this purpose, the water can in particular be filtered multiple times, as will be explained below. By way of example, water from the last operation for rinsing crockery in the treatment chamber 14, in which operation some rinsing agent may be present, can thus also be stored in the water reservoir 47. During the next rinsing operation in the dishwasher 11, it can then be used at the beginning to remove coarse contaminants from the crockery, and no clean fresh water is required for this purpose.

Furthermore, water from the water reservoir 47 can also be used, in order to be drawn in by the pump 40 and then likewise to back-wash the coarse particle filter 29. Here, the water conduction, as illustrated by way of dashed lines, can then lead from the water reservoir 47 via valves (not illustrated) to the pump 40 or to the pump inlet 42. For said back-washing or cleaning of the coarse particle filter 29, fresh water is in particular not necessarily required. The removal of coarse particles from the coarse particle filter 29 can advantageously take place at the end of the rinsing operation. For this purpose, however, it is also possible, as demonstrated by the water conduction which is illustrated by way of solid lines, for water to be taken from the sump 19, said water otherwise being pumped out in any case towards the discharge outlet 38. At the end of the rinsing operation, it is also generally no longer expected that coarse particles, which have not been caught in the coarse particle filter 29, are still located in the treatment chamber 14.

Figure 3:
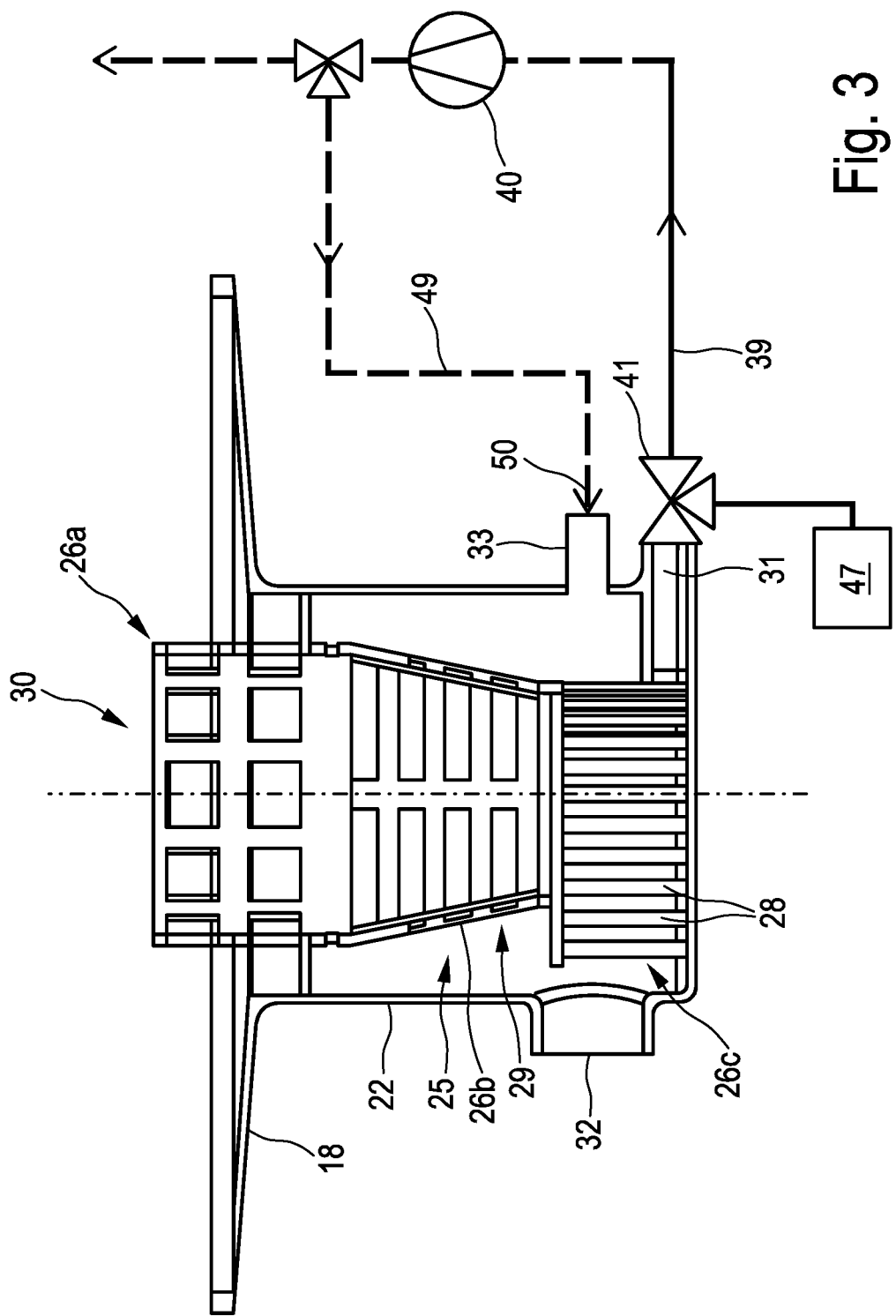
FIG. 3 shows a sectional view through a sump of the dishwasher from FIG. 1 having a coarse particle filter and a possibility for back-washing.

FIG. 3 shows a structural refinement of such a sump 19 for the dishwasher illustrated above or, in general, a water-conducting household appliance according to the invention. On a surface above the trough 18, there could be placed an aforementioned perforated plate or grating, the surface of which is penetrated only by an upper part 26*a* of a grating insert 25. Here, there are large, readily visible openings through which the mentioned coarse particles, such as, for example, cherry stones, but no crockery or cutlery, can enter. In a middle part 26*b*, slot-like openings are provided, through which coarse particles can again not escape from the grating insert 25, such that they fall downwards into the lower part 26*c*. There, the so-called coarse particle trap is then formed by grating bars 28 which are arranged in such a way that they form a kind of U in plan view. The ends of the limbs of said U reach directly to the wall of the cylinder portion 22. A coarse particle filter water outlet 31, which leads to the schematically illustrated single pump 40, goes to the right. Here, a three-way valve 41 is also illustrated, which is for example connected to the water reservoir 47 and likewise also to the water line 39 to the pump 40. By way of the grating 28 of the coarse particle trap, it is not possible for the coarse particles to escape here to the right towards the coarse particle filter water outlet 31. The grating insert 25, together with the coarse particle trap 28 at the bottom, therefore forms the above-described coarse particle filter 29.

From the cylinder portion 22, a coarse particle filtrate outlet 32 branches off to the left in the form of a kind of pipe socket to which the outlet line 35 can connect. The coarse particle filter flushing inlet 33 leads from the right into the cylinder portion 22 and towards the coarse particle filter 29, specifically by means of the flushing line 49. If the pump 40, as explained above, pumps in water here, said water advantageously coming from the water reservoir 47, then the coarse particles are flushed out of the lower part 26*c* or the coarse particle trap 28 towards the coarse particle filtrate outlet 32 by way of the water. They then leave the dishwasher 11 via the outlet line 35, the valve 36 and the discharge outlet 38.

Figure 4:
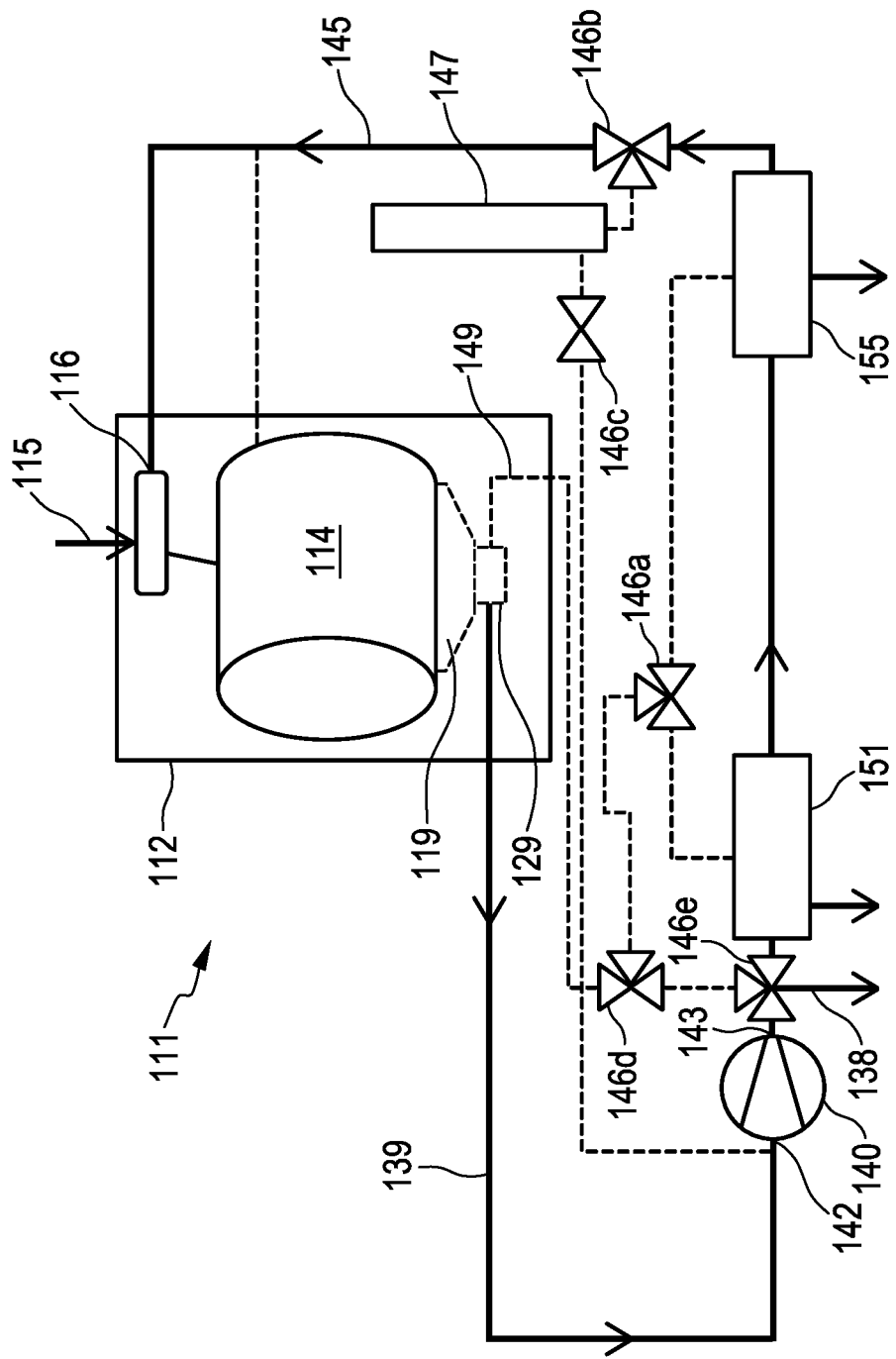
FIG. 4 shows an illustration of water conduction for a washing machine having a coarse particle filter at the bottom of a sump, a single pump and two further filters in recycling operation.
Figure 5:
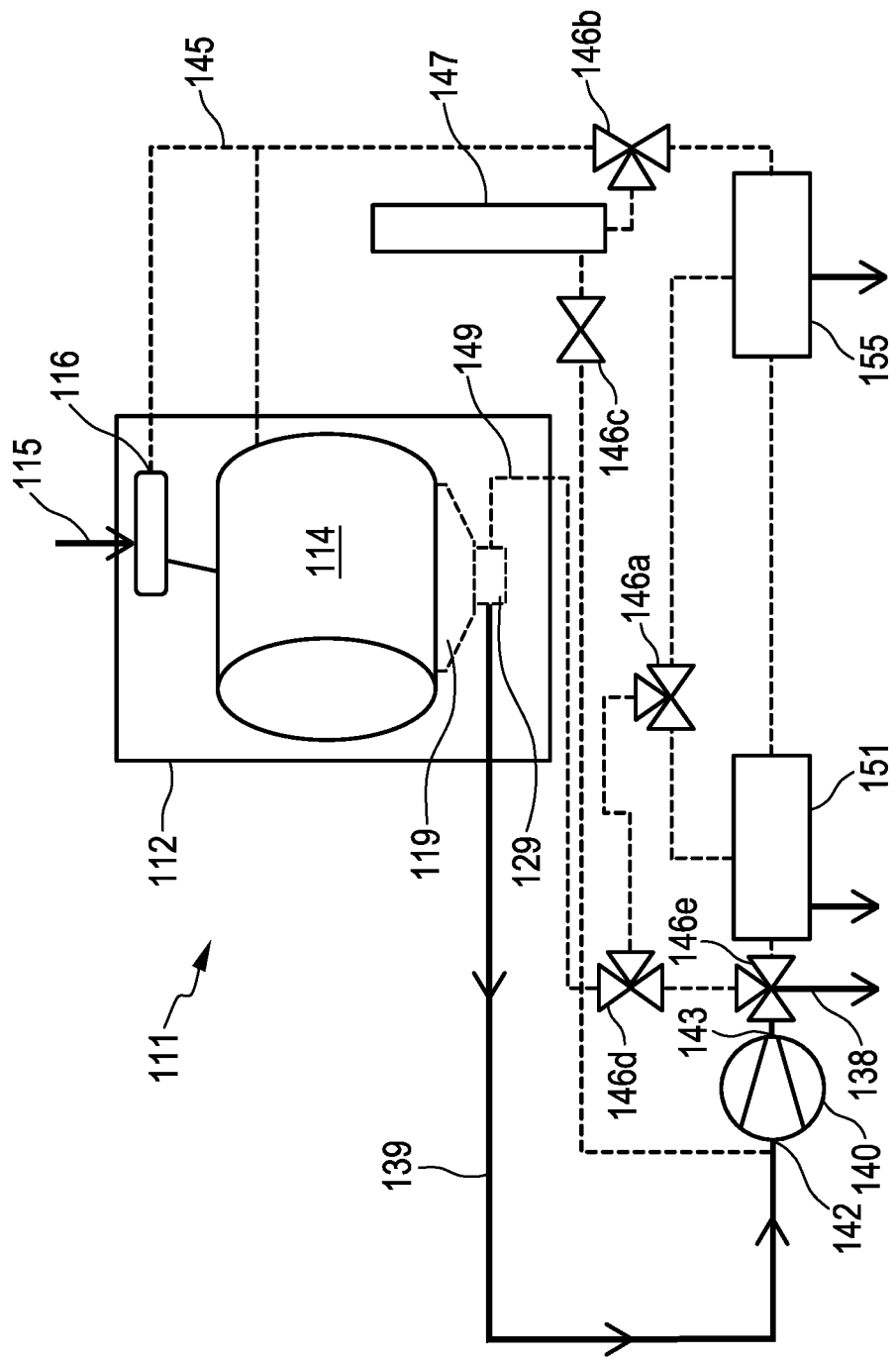
FIG. 5 shows the washing machine from FIG. 4 having water conduction for pumping water out of the washing machine and FIG. 6 shows the washing machine from FIG. 5 during back-washing of the coarse particle filter by means of water from a water reservoir.
Figure 6:
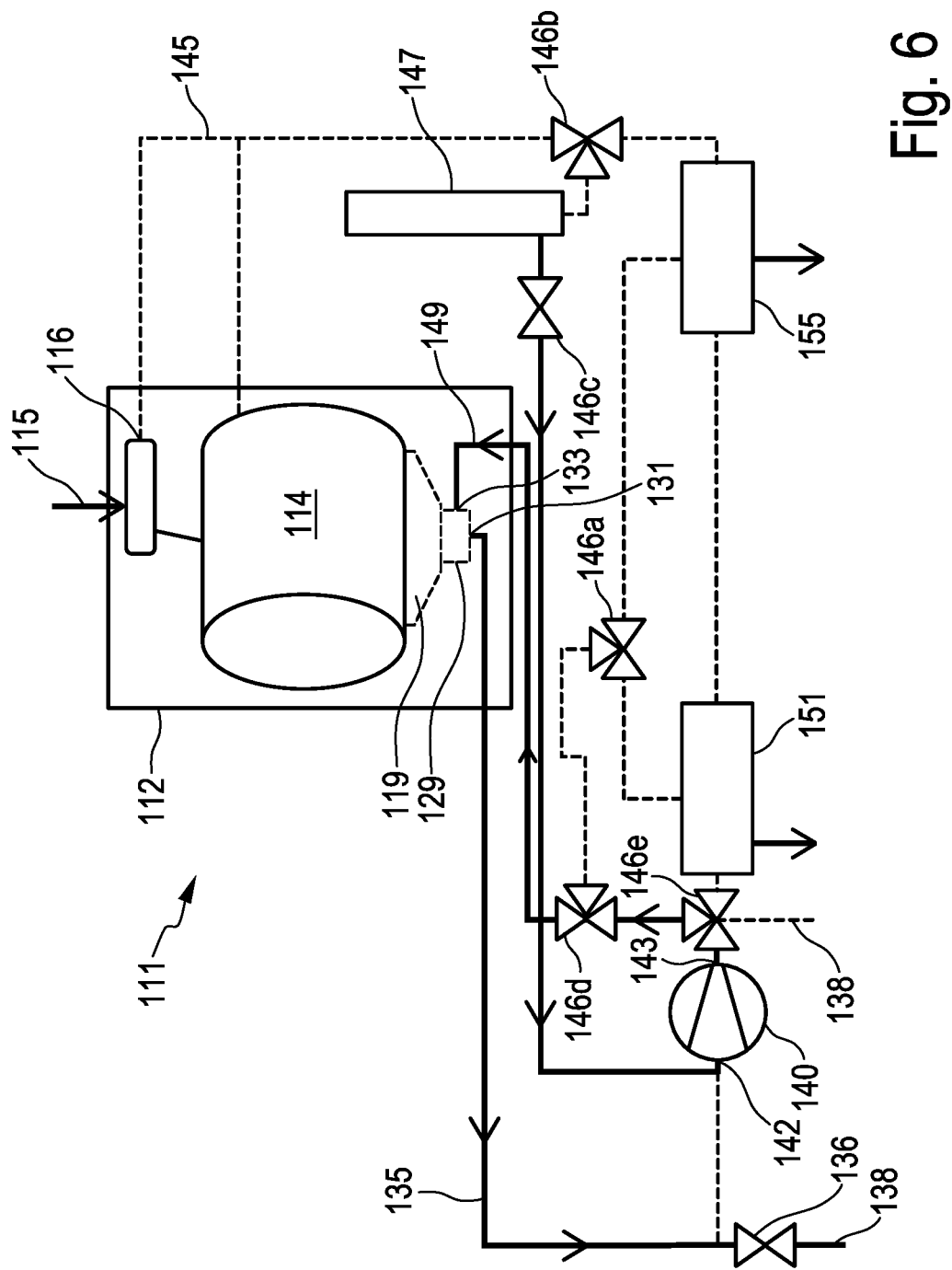

FIGS. 4 to 6 illustrate how water conduction can be configured for a washing machine 111 as household appliance according to the invention having a housing 112. Here, in addition to a coarse particle filter 129, illustrated in simplified fashion, at the bottom of a sump 119 of a treatment chamber 114, a coarse filter 151 and a fine filter 155 are provided. The coarse particle filter 129, together with the sump 119, can be configured as in FIG. 3, but also in a known manner at the bottom of the treatment chamber 114, in which a drum rotates for the washing to be treated. At the top above the treatment chamber 114, a detergent drawer 116 is provided, into which a water inlet 115 leads from the outside. In addition, as is customary, detergent and other agents can be poured in here for the treatment operation. A supply line 145 leads into the detergent drawer 116 via a valve 146b which is configured as a three-way valve.

Water from the sump 119 flows through the coarse particle filter 129 and, at a pump inlet 142, into a pump 140. For the recycling operation illustrated in FIG. 4, the water, at a pump outlet 143, is pumped into the aforementioned supply line 145 and thus into the detergent drawer 116 via a valve 146e, a coarse filter 151 and a fine filter 155 and also the valve 146b. From there, it automatically enters the treatment chamber 114. As an alternative, water can at least partially also be pumped directly into the treatment chamber 114 or onto washing located therein according to the water line illustrated by way of dashed lines.

The coarse filter 151 and the fine filter 155 are configured, and operate, as described above. Microfibres, in particular, can be filtered out in the fine filter 155, so that it is not possible for said microfibres to make it into the waste water. The disposal can then be performed manually, for example. An arrow goes in a downward direction from both filters, either for disposal purposes or into a measuring chamber, which is likewise described above, in order to be able to examine the respective filtrate or the respectively filtered water. The filters 151 and 155 can also be bypassed, as required, via the valves 146a to e.

Via the valve 146b and/or the valve 146c, water can also be introduced into a water reservoir 147 by means of the pump 140. It can be removed therefrom as required, as described above.

The water which makes it into the pump 140 has always been coarsely filtered by the coarse particle filter 129, such that the pump 140 cannot be damaged by coarse particles which can obviously also arise in a washing machine 111.

FIG. 5 illustrates how the pump 140 can pump water out of the treatment chamber 114 to a discharge outlet 138. The water flows through the coarse particle filter 129 and through the pump line 139 to the pump 140, and from said pump via the valve 146e towards the discharge outlet 138. However, the water could also be filtered in the coarse filter 151 and/or in the fine filter 155 before being pumped out.

FIG. 6 illustrates how coarse particles can be removed from the coarse particle trap 129 in a manner corresponding to FIG. 3. Here, water is drawn in from the water reservoir 147 via the valve 146c, the water having previously been stored in the water reservoir 147, for example from one of the last rinsing operations in the washing machine 111, said water therefore only being a little bit dirty. The pump 140 then pumps said water, via the valves 146e and 146d and through the flushing line 149, into the coarse particle filter 129, and specifically to a coarse particle filter flushing inlet 133 (not illustrated). This, again, also corresponds to FIG. 3. The coarse particles collected there are then flushed out of the washing machine 111, at a coarse particle filtrate outlet 132, through an outlet line 135 and a valve 136 towards the discharge outlet 138.

In the case of a washing machine having a single pump 140 which is also advantageously configured as an impeller pump and which can have an integrated heating device, it is thus also possible for the coarse particle filter to be cleaned. In addition, it is also possible in this case to dispense with a further lye pump, which is mentioned in the introduction. The corresponding expense can be saved as a result.

The invention claimed is:
1. Water-conducting household appliance comprising:
a treatment chamber, wherein said treatment chamber can be closed and wherein in said treatment chamber articles can be treated,
at least one chamber water inlet into said treatment chamber,
at least one sump at a bottom in said treatment chamber or under said treatment chamber,
a coarse particle filter for separating coarse particles having a size ≥5 mm from water in said treatment chamber or from water exiting from said sump, wherein said coarse particle filter has a coarse particle filter inlet, a coarse particle filter water outlet and a coarse particle filtrate outlet,
exactly one pump for said entire household appliance, said pump being connected downstream of said sump and said coarse particle filter water outlet, wherein said pump comprises:
a pump inlet and a pump outlet,
water lines,
two or more valve devices,
a discharge outlet from said household appliance,
a pump water line from said coarse particle filter water outlet to said pump or to said pump inlet,
two chamber water outlets from said sump, and
a coarse filter and a fine filter for water from said treatment chamber, wherein:
a coarse-particle chamber water outlet branches off from said coarse particle filtrate outlet of said coarse particle filter towards said discharge outlet,
a normal chamber water outlet branches off from said sump, said normal outlet either being separate from said coarse particle filter or forming said coarse particle filter water outlet,
said coarse filter comprises: a coarse filter inlet, a coarse filter water outlet for filtered water having particles up to 1 mm in size, and a coarse filtrate outlet for coarse filtrate,
said fine filter comprises: a fine filter inlet, a fine filter water outlet for filtered water having particles less than 0.1 mm in size, and a fine filtrate outlet for fine filtrate,
said coarse filter is connected, at said coarse filter inlet thereof, by means of a normal chamber water line to said normal chamber water outlet, and
said fine filter is connected to said coarse filter water outlet by means of a coarse water line.
2. Household appliance according to claim 1, wherein at least one of said valve devices is configured as a shut-off valve.
3. Household appliance according to claim 1, wherein at least one of said valve devices is configured as a three-way valve or as a four-way valve.
4. Household appliance according to claim 1, wherein:
an outlet water line is provided from said coarse particle filter water outlet or from said coarse particle filtrate outlet, and
said outlet water line in each case leads to said discharge outlet.
5. Household appliance according to claim 1, wherein:
said coarse filter can be back-washed for removing coarse filtrate therefrom from said coarse filtrate outlet,
said coarse filtrate outlet is led by means of an outlet water line to said discharge outlet from said household appliance or to an examining chamber, and
for back-washing said coarse filter, water is led towards said coarse filter water outlet into said coarse filter, and said coarse filtrate exits from said coarse filtrate outlet towards said discharge outlet.

6. Household appliance according to claim 1, wherein:
a water path, by means of water lines from said sump, is always led via said coarse particle filter or said coarse filter to said pump, and
the coarse particle filter water outlet or said coarse filter water outlet is connected to said pump inlet.

7. Household appliance according to claim 1, wherein at least one water reservoir is provided, wherein said water reservoir can be connected by means of a reservoir water line to said chamber water inlet or can be connected by means of the reservoir water line to said pump or can be connected by means of the reservoir water line to a coarse particle filter inlet of said coarse particle filter introducing water into said coarse particle filter in order to flush coarse particles located therein out of said coarse particle filtrate outlet towards said discharge outlet.

8. Household appliance according to claim 7, wherein:
the at least one water reservoir comprises a first water reservoir and a second water reservoir, and
the first water reservoir is a clean water reservoir and the second water reservoir is a dirty water reservoir.

9. Household appliance according to claim 8, wherein:
said clean water reservoir is configured for back-washing said filters, and
said dirty water reservoir is provided for a treatment operation for said articles.

10. Household appliance according to claim 7, wherein said coarse filter water outlet is led by means of a three-way valve or a four-way valve to said water reservoir and to said treatment chamber.

11. Household appliance according to claim 7, wherein:
said water reservoir is connected to two water lines,
a first water line leads via a valve device to said coarse filter water outlet, and
a second water line leads via a valve device to said coarse filter or to said pump.

12. Household appliance according to claim 7, wherein said water reservoir is connected by means of two valve devices to said coarse filter water outlet or to said pump inlet.

13. Household appliance according to claim 1, wherein;
said household appliance has an examining chamber for examining water or filtrate therein, and
said examining chamber has an examining chamber inlet and is connected to said coarse filtrate outlet with said examining chamber inlet.

14. Household appliance according to claim 1, wherein said coarse particle filter is configured as a coarse particle trap and is arranged in a lower region of said sump.

15. Household appliance according to claim 14, wherein:
said coarse particle filtrate outlet leads by means of an outlet water line to said discharge outlet, and
said coarse particle filter water outlet forms a water outlet from said sump.

16. Household appliance according to claim 1, wherein said pump is arranged downstream of said coarse particle filter water outlet and downstream of said coarse filtrate water outlet or is arranged downstream of said coarse particle filter water outlet and upstream of said coarse filter inlet.

17. Household appliance according to claim 1, wherein:
a sump water outlet is provided at said sump,
said pump is arranged between said sump water outlet or said coarse particle filter water outlet and said coarse filter inlet.

* * * * *